Jan. 17, 1967   J. LOOMAN   3,298,084
FACE AND SIDE CUTTER
Filed Nov. 4, 1964   2 Sheets-Sheet 1

Inventor:
JOHANNES LOOMAN
by: Albert M Zalkind

United States Patent Office 3,298,084
Patented Jan. 17, 1967

3,298,084
FACE AND SIDE CUTTER
Johannes Looman, Friedrichshafen, Germany, assignor to Zahnradfabrik Friedrichshafen AG, Friedrichshafen, Germany
Filed Nov. 4, 1964, Ser. No. 408,825
Claims priority, application Germany, Nov. 15, 1963, Z 10,471
5 Claims. (Cl. 29—95)

This invention relates to gear shaper cutters and more particularly to a new and useful method of resharpening such gear cutters.

The present invention is concerned with the cutting of gear teeth by the generating action of a gear shaper cutter on a gear blank. The cutter utilized in this method of cutting gears must be reground or sharpened after use and the amount of material removed by wear and grinding has been considerably limited because of the dimensional accuracy to be maintained in the gear teeth being cut. It is therefore a primary object of the present invention to sharpen gear shaper cutters in such a manner as to eliminate the dimensional error introduced by removal of material from the cutter each time it is resharpened.

An additional object of the invention is to resharpen a gear shaper cutter in such a manner as to prolong its useful life.

A further object of this invention is to provide a modified form of gear shaper cutter and a sharpening procedure by means of which more resharpening may be tolerated and closer tolerances maintained in the gears cut throughout a prolonged useful life of the cutter.

In accordance with the foregoing objects, the gear cutter is sharpened as in the past by resurfacing the forward cutting edge maintaining the same rake angle. The reduction in the width of the cutter along its rotational axis produces an increase in the angle between the tangent at the contact point of the generated tooth profile and its rotational axis. This increase in the mesh angle is offset in accordance with the present invention by increasing the rake angle of the cutter, each time the cutter is resharpened, as a function of the reduced width of the cutter measured along the end gear face of the cutter. The mesh angle of the gear teeth cut by any given cutter may thereby be maintained constant regardless of the amount of cutter resharpening involved.

These together with other objects and advantages which will become subsequently apparent reside in the procedural, structural and operational details as more fully hereinafter described and claimed, reference being had to the accompanying drawings forming part hereof, and in which:

FIG. 1 is a composite of sections 1a and 1b of a gear shaper cutter before and after resharpening.

Section 1a is a partial diametric section through a typical gear shaper cutter prior to use.

Section 1b is a partial diametric section through the cutter in a resharpened state, whereby the gear cutter is sharpened as in the past by resurfacing the forward cutting edge maintaining the same rake angle.

Figure 1:
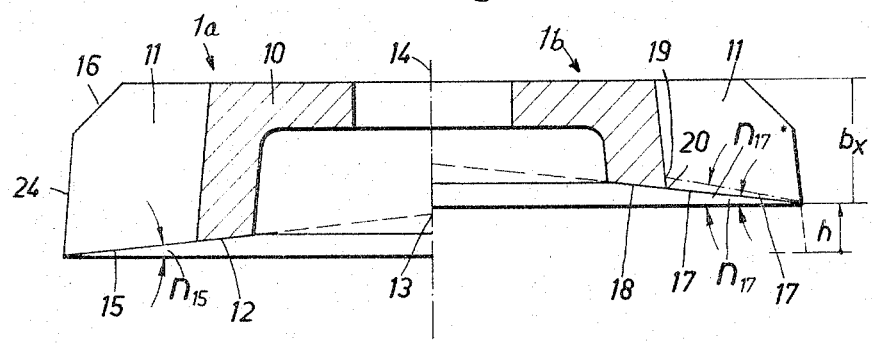
Figure 2:
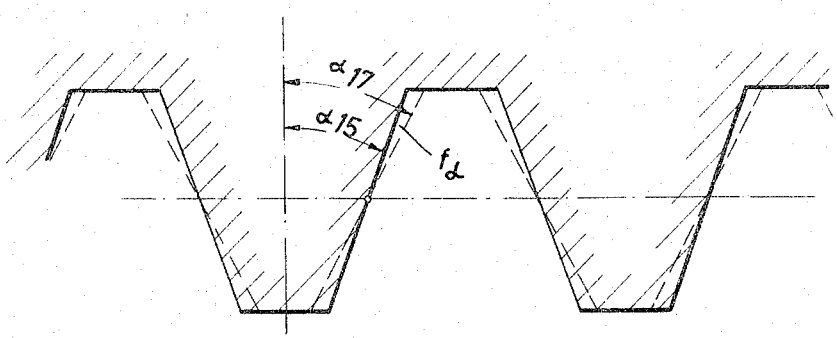
FIGURE 2 is an enlarged section of a gear rack cut by the cutters shown in sections 1a and 1b, and showing the increase in the mesh angle.

A typical gear shaper cutter 10 is shown in section 1a in the form of an externally toothed gear adapted to generate teeth in a gear blank, such as the rack teeth shown in FIGURE 2, by rapid reciprocation of the cutter along its rotational axis 14 and slow indexed rotation about the axis 14 preceding each reciprocatory stroke. To get clearance of the flanks 11 and end face 24 of the teeth of the cutter 10 when shaping a work gear, the flanks 11 of a cutter tooth are not parallel but inclined to each other by a small helix angle.

The forward side 12 of the cutter is formed as a segment of a conical surface having an apex 13 on the cutter feed axis 14 to thereby define a cutting edge 15 which is the intersection line between a flank 11 and the cone surface 12. The cone angle or forward rake angle is designated $n15$ in section 1a. The index 15 refers to the cutting edge 15 of the gear shaper cutter prior to use. In this conventional type of cutter, a chamfer 16 is formed to interrupt the end face of the cutter tooth which is provided with the usual side clearance. The chamfer is dimensioned so as to limit the reduction in axial width of the cutter by resharpening to a value beyond which it is no longer suitable.

Section 1b therefore shows the cutter in a reshapened state wherein the axial width of the cutter has been reduced by an amount $h$ leaving a width $bx$. According to prior practice, the worn cutting edge is resurfaced resulting in the axial shift of the conical surface 12 to surface 18 which forms the rake angle $n17$ which is equal to the original rake angle $n15$. Rack teeth cut by the original cutter as shown by solid line in FIGURE 2, will deviate in profile from the teeth cut by the sharpened cutter as shown by dotted line. The mesh angles respectively corresponding to the tooth profiles are designated as $\alpha 15$ and $\alpha 17$, the difference $f\alpha$ between these mesh angles will progressively increase each time the cutter is resharpened by prior methods until further sharpening reduces the cutter width to a limit determined by chamfer 16.

The mesh angle $\alpha$ increases after each sharpening because of the curvature of the flanks 11 of the helical cutter teeth as can be shown mathematically or by graphical methods. This increase $f\alpha$ in the mesh and angle $\alpha$ is offset according to the invention by increasing the forward rake angle to $n17'$ as shown in section 1b forming a modified cutting edge 17' as shown by dotted line. Because of the inclination of the flanks 11, the modified root width of the cutter tooth at point 19 is somewhat less than the tooth width at point 20 resulting in a reduction in the angle of mesh produced by the modified cutting edge 17'. Accordingly, the modified rake angle $n17'$ may be selected for a given width $bx$ to which the cutter is sharpened in order to produce a resultant mesh angle which is equal to the original mesh angle $\alpha 15$ despite the resharpening of the cutter.

Figure 3:
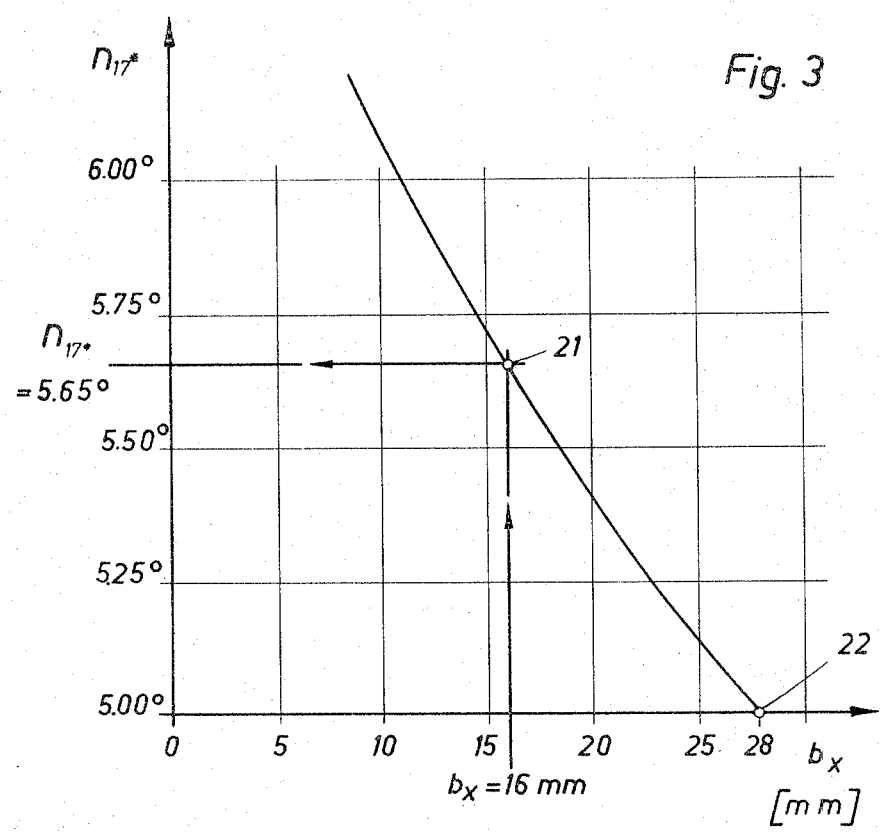
FIGURE 3 is a graphical chart from which data is obtained for sharpening the cutter shown in section 1a, in accordance with the present invention.

The relationship between cutter width $bx$ and modified rake angle $n17'$ necessary to maintain a constant mesh angle is represented by the curve shown in FIGURE 3 for a given cutter having 30 teeth and a pitch diameter of 150 millimeters (or a module of 5). Thus, for a resharpened width $bx$ of 16 mm., the modified rake angle for the cutter is determined from the curve intersection 21, as 5.65°. This rake angle will therefore correspond to the same mesh angle produced by the original cutter having a width of 28 mm. and a rake angle of 5° as indicated by point 22 on the curve in FIGURE 3. Graphical charts may be similarly prepared and used for different sized cutters.

Figure 4:
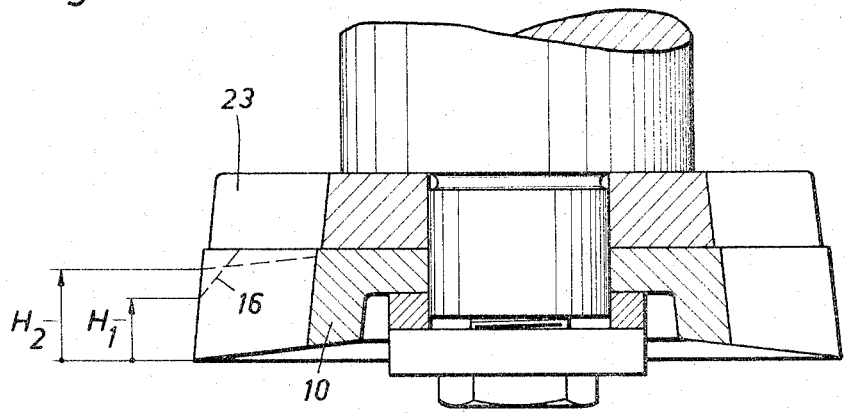
FIGURE 4 is another gear shaper cutter modified in accordance with the present invention.

It will be apparent that sharpening of the cutter by the method of the present invention need not be limited by the chamfer 16 as usually formed on such cutters because of dimensional tolerances to be maintained in the gears being cut. Thus, the chamfer may be dimensionally reduced to a point where the width or thickness of the cutter renders it structurally unsuitable. The chamfer 16 may alternatively be eliminated as shown in FIGURE 4 so as to increase the permissible reduction in cutter width from H1 to H2. In such case, a toothed backing disc 23 is utilized to structurally enhance the cutter by absorbing the cutting forces imposed thereon.

The forward side 12 of the cutter teeth is not limited to the cone shape. It can likewise be a plane or a fillet.

It will be appreciated from the foregoing, that gear teeth of all types may be cut including external, internal, straight, and helical spur gear teeth, a constant mesh angle being maintained regardless of the amount of resharpening of the cutter. The method of the present invention is thereby effective to maintain better accuracy in the cutting of gear teeth as well as to prolong the useful life of the cutter.

The foregoing is considered as illustrative only of the principles of the invention. Further, it is not desired to limit the invention to the exact structure, operation and procedures described, and accordingly all suitable modifications, equivalents and additions may be resorted to, falling within the scope of the invention as claimed.

What is claimed as new is as follows:

1. A method of sharpening a gear shaper cutter having a forward cutting edge disposed at a predetermined rake angle to a plane perpendicular to the rotational axis of the cutter, including the steps of: resurfacing the cutting edge by reducing the axial width of the cutter throughout; measuring the reduction in width of the cutter; and increasing the rake angle in accordance with said measured reduction in width so as to maintain a constant mesh angle for all gear tooth profiles generated by the cutter.

2. The method of claim 1 including the steps of progressively reducing the axial width of the cutter for resharpening purposes to a dimensional limit prescribed only by the ability of the cutter to resist cutting forces imposed thereon.

3. The method of claim 2 including the step of structurally backing the cutter to absorb the cutting forces imposed thereon.

4. In a sharpened gear shaper cutter having a cutting tooth provided with a forward rake angle designed for cutting a gear blank upon reciprocation of the cutter along the rotational axis thereof, said rake angle being a varying function of the axial width of the cutting tooth along an end face thereof to generate tooth profiles with a constant mesh angle.

5. The cutter defined in claim 4, including a toothed backing disc fixed to the cutter for absorbing cutting forces imposed thereon.

No references cited.

ANDREW R. JUHASZ, *Primary Examiner.*

H. L. HINSON, *Assistant Examiner.*